United States Patent [19]

Ito

[11] Patent Number: 5,284,672

[45] Date of Patent: * Feb. 8, 1994

[54] METHOD OF PRODUCING AN EDIBLE CONTAINER

[76] Inventor: Sadaharu Ito, 30-5, Saginomiya 1-chome, Nakano-ku, Tokyo, Japan

[ * ] Notice: The portion of the term of this patent subsequent to May 22, 2007 has been disclaimed.

[21] Appl. No.: 921,324

[22] Filed: Jul. 29, 1992

[51] Int. Cl.$^5$ ............................................. A21D 13/08
[52] U.S. Cl. .................................. 426/549; 426/138; 426/139; 426/391; 426/553; 426/558
[58] Field of Search ................ 426/138, 139, 549, 502

[56] References Cited

U.S. PATENT DOCUMENTS

| | | | |
|---|---|---|---|
| 4,927,655 | 5/1990 | Ito | 426/138 |
| 4,927,656 | 5/1990 | Ito | 426/138 |

FOREIGN PATENT DOCUMENTS

| | | |
|---|---|---|
| 38-6554 | 5/1963 | Japan . |
| 50-82277 | 7/1975 | Japan . |
| 59-109127 | 6/1984 | Japan . |
| 61-149036 | 7/1986 | Japan . |

*Primary Examiner*—Jeanette Hunter
*Assistant Examiner*—Mary S. Mims
*Attorney, Agent, or Firm*—Nixon & Vanderhye

[57] ABSTRACT

The present invention relates to a method of producing an edible container in the form of a cone, cup or dish in which is placed frozen confections such as soft ice cream or ice cream as well as various other food products, or in other words, an edible container referred to as a waffle cone, etc. that has a small apparent specific gravity, is porous and lightweight, and preferably has a crispy texture when eaten.

10 Claims, 7 Drawing Sheets

METHOD OF PRODUCING AN EDIBLE CONTAINER

BACKGROUND OF THE INVENTION

Edible containers that are sold to contain frozen confections, such as soft ice cream or ice cream served in stores, are typically delivered to the location where the ice cream is sold by a specialized cone manufacturer. These edible containers are manufactured by blending a large amount of water into raw ingredients such as wheat flour, and kneaded to form a dough. The dough is then baked on a high-temperature heating plate, formed into the shape of cones (e.g. waffle cones) and packaged for transport. However, as waffle cones are characteristically extremely crispy, and since they tend to break easily as a result of being susceptible to impact, there are numerous difficulties encountered in their handling both during baking as well as after baking until they are delivered to ice cream stores and other retail points of use.

In order to eliminate these various problems, a method for producing an edible container has been disclosed in JP Pat. Laid-open No. 63-216425 developed by the present applicant is disclosed. The disclosed method includes of producing an edible container by mixing and kneading raw ingredients, such as wheat flour, with water to form a dough which is then spread out on a heating plate. The kneaded dough is then spread out onto the first heating plate and is sandwiched between another heating plate, so as to alphatize the flour starch in the kneaded dough. The moisture in the kneaded dough is adequately evaporated by heating and drying to an extent to which moisture is also removed. The sheet-like dough heated and dried in the previous process steps is then cooled while in the dry state and stored. A final heating process step may then be practiced wherein the dried and stored product is heated in advance to an extent that it is softened and, thereafter molded in such a softened state to the desired shape.

The molded sheet that has been heated and dried in the above-mentioned prior art demonstrates properties like those indicated in attached Tables 1 and 2 depending on differences in the heating and drying conditions as well as the amount of residual moisture.

As can be seen from the tables, molded sheet 5A having a residual moisture of 10-12% and molded sheet 5B having a residual moisture of roughly 3% have both advantages and disadvantages that cannot be mutually compensated for in terms of releasability, handling ease and final heating time.

In addition, although a molded sheet having a residual moisture content of 6-8% was made by heating for roughly 150 seconds at a temperature of 120° in order to solve these problems, since bonding between the starch matrix and water (water addition) does not occur sufficiently at this temperature, the problems were unable to be eliminated as the resulting molded sheet was feeble, did not release easily from the heating plate and was slightly susceptible to tearing. Based on these results, unless a product that is crispy when eaten, or in other words, a thin molded sheet that is porous and lightweight, is not formed into a baked food product consisting primarily of starch in which the starch matrix is completely baked at a temperature of 180° C. or higher, the temperature of the oil component remains at or above its boiling point, and the sugar component is caramelized to a certain degree giving the product a brown tint, it will be difficult to remove the baked product from the baking plate without tearing. Even if, for example, the baked product is able to be removed from the baking plate, since it has not been heat-treated for the purpose of stabilization as a food product, it has several problems including deterioration of the starch component and oxidation of the oil component.

In addition, 30-40% of the moisture of molded sheet 5A having a residual moisture content of 10-12% of the above-mentioned Table 1 consists of bound water of a matrix consisting primarily of starch, and water in solution that forms a sugar solution by binding with sugar. The remainder is believed to be present in the form of free water. Thus, phase transformation resulting from a change in the temperature of the moisture content for the free water portion of the moisture remaining in the matrix is used for the heat energy for the final heating process of molded sheet 5A.

In other words, it is believed that the proportion of the required energy consumed for use in bond dissociation in the case of the bonded water of the starch matrix and the water in solution in which sugar and other water soluble substances are dissolved (chemical water), is much greater in comparison to that consumed for simple phase change of the free water.

Consequently, a heating time of at least 60 seconds at 210° C. is required in the heating process. In particular, in the case of stores in which this final heating is performed in front of the customer, although efforts are made to increase this final heating temperature or shorten the heating time, when the finished product is sold in the state in which the product contains large amounts of bound water and chemical water, the finished product lacks both the taste and flavor of a food product.

In addition, molded sheet 5B, wherein the dough is heated at 180° C. in advance for roughly 90 seconds to bring the residual moisture content to roughly 3%, becomes brittle when cooled while also becoming susceptible to cracking and falling apart. As such, it is difficult to handle.

On the contrary, the majority of the free water is evaporated and dispersed naturally leaving the moisture bound in the starch matrix and a considerable portion of the chemical water in which sugar and other water soluble substances are dissolved. Even if it were to be reabsorbed, that water would only be in the form of simple humidity within the molded product, or in other words, be only a small amount of free water. Since this would never become bound water, this moisture can be easily dispersed by heating for a short period of time thereby restoring the molded product to its original state without loss of taste or flavor.

SUMMARY OF THE INVENTION

The present invention pertains to a method of producing an edible container, and more particularly, relates to a method of producing an edible container in the form of a cone, cup or dish in which frozen confections, such as soft ice cream or ice cream as well as various other food products are placed. The edible container of this invention has a small apparent specific gravity, is porous and lightweight, and preferably has a crispy texture when eaten.

More specifically, in order to solve the numerous problems mentioned above and in consideration of the various points mentioned above, the object of the present invention is to provide an edible container inexpensively and in large volume wherein a molded sheet, heated and dried using a water content that allows the dough to be easily released from the heating plate, is moisturized in advance to facilitate later handling and shorten final heating processing time resulting in a crispy texture.

BRIEF DESCRIPTION OF THE DRAWINGS

All the drawings shown indicate one embodiment of the present invention.

DESCRIPTION OF THE PREFERRED EMBODIMENT

Figure 1:
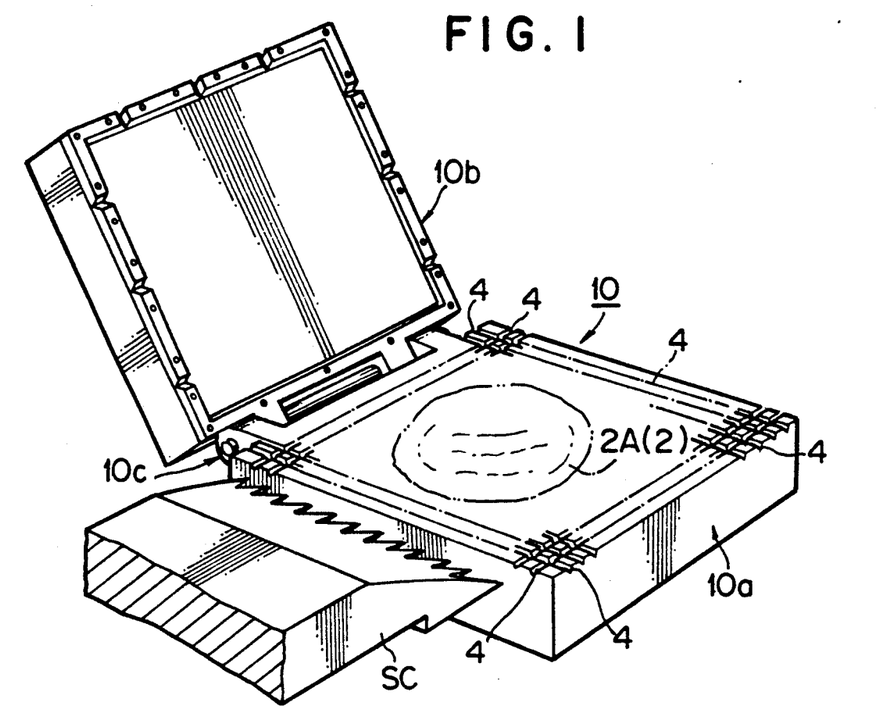
FIG. 1 is a perspective view of a baking apparatus.

The basic method of producing an edible container of the present invention first involves the incremental kneading of equal amounts of wheat flour and water followed by spreading out dough 2, made by mixing the kneaded mixture with suitable amounts of sugar and oil, on heating plate 10 as indicated in FIG. 1.

Figure 2:
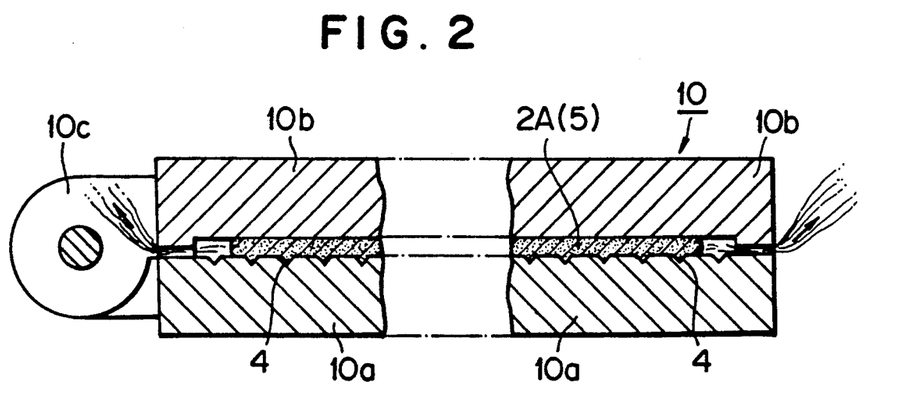
FIG. 2 is a partial cross-sectional view showing the baking state of the baking apparatus.

Kneaded dough 2A on the heating plate 10 is then sandwiched between the heating plate 10 and another heating plate as indicated in FIG. 2 followed by heating and drying for roughly 90 seconds at 180° C. to an extent such that the wheat starch in the kneaded dough 2A is alphatized and the moisture in the above-mentioned kneaded dough 2A is sufficiently evaporated.

Figure 3:
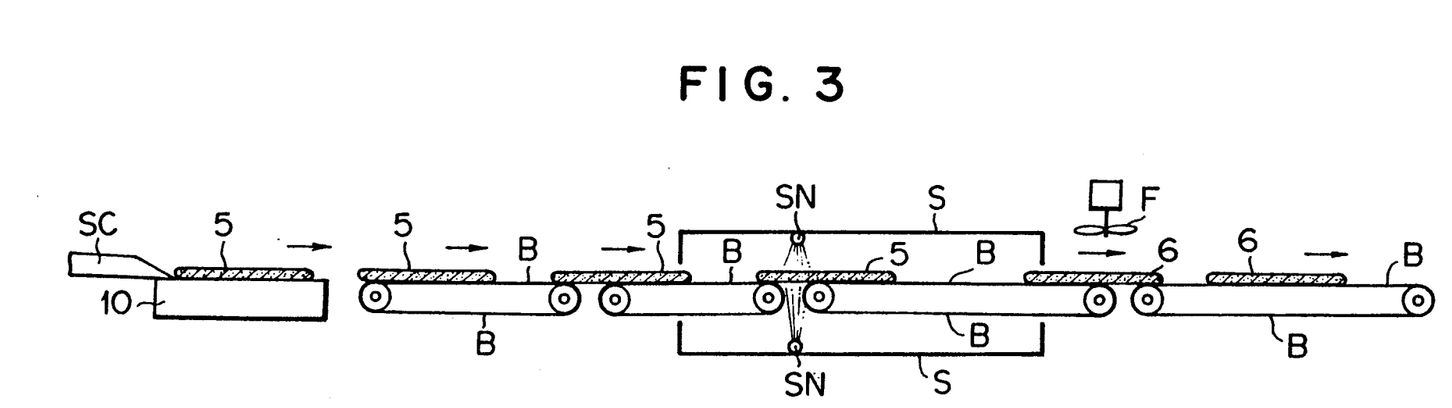
FIG. 3 is a schematic drawing indicating one example of the transfer process and the moisturizing process.
Figure 4:
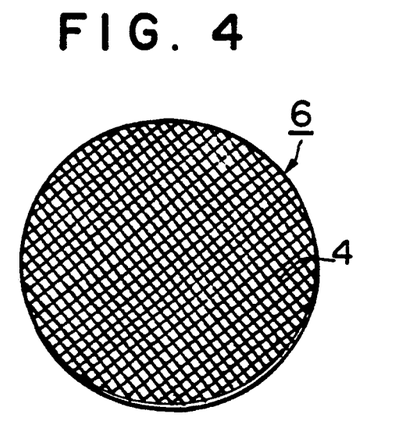
FIG. 4 is a plan view of molded sheet following moisturization.
Figure 5:
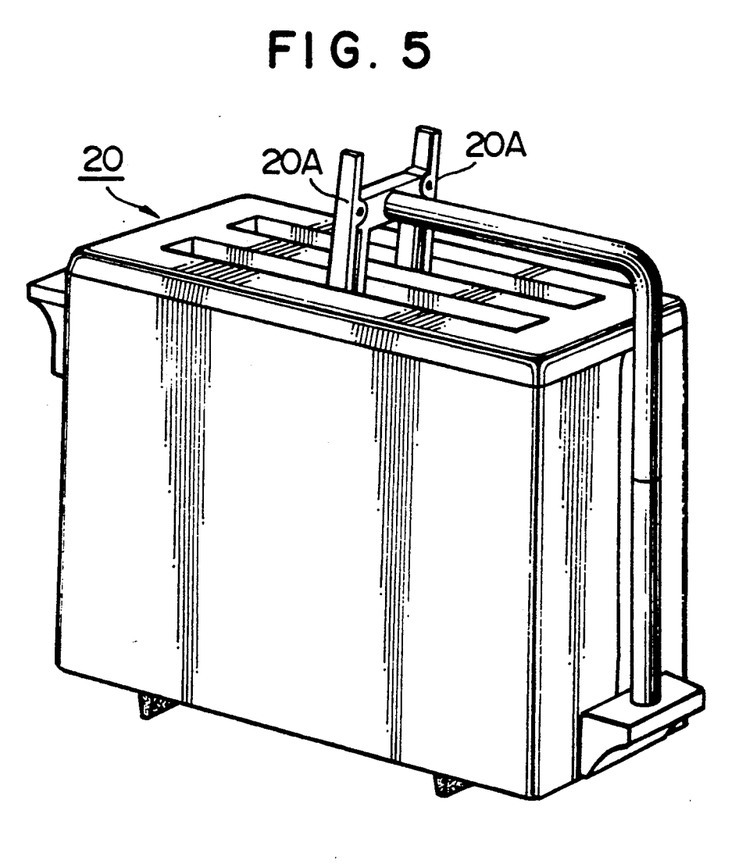
FIG. 5 is a perspective view indicating one example of the final baking apparatus.
Figure 6:
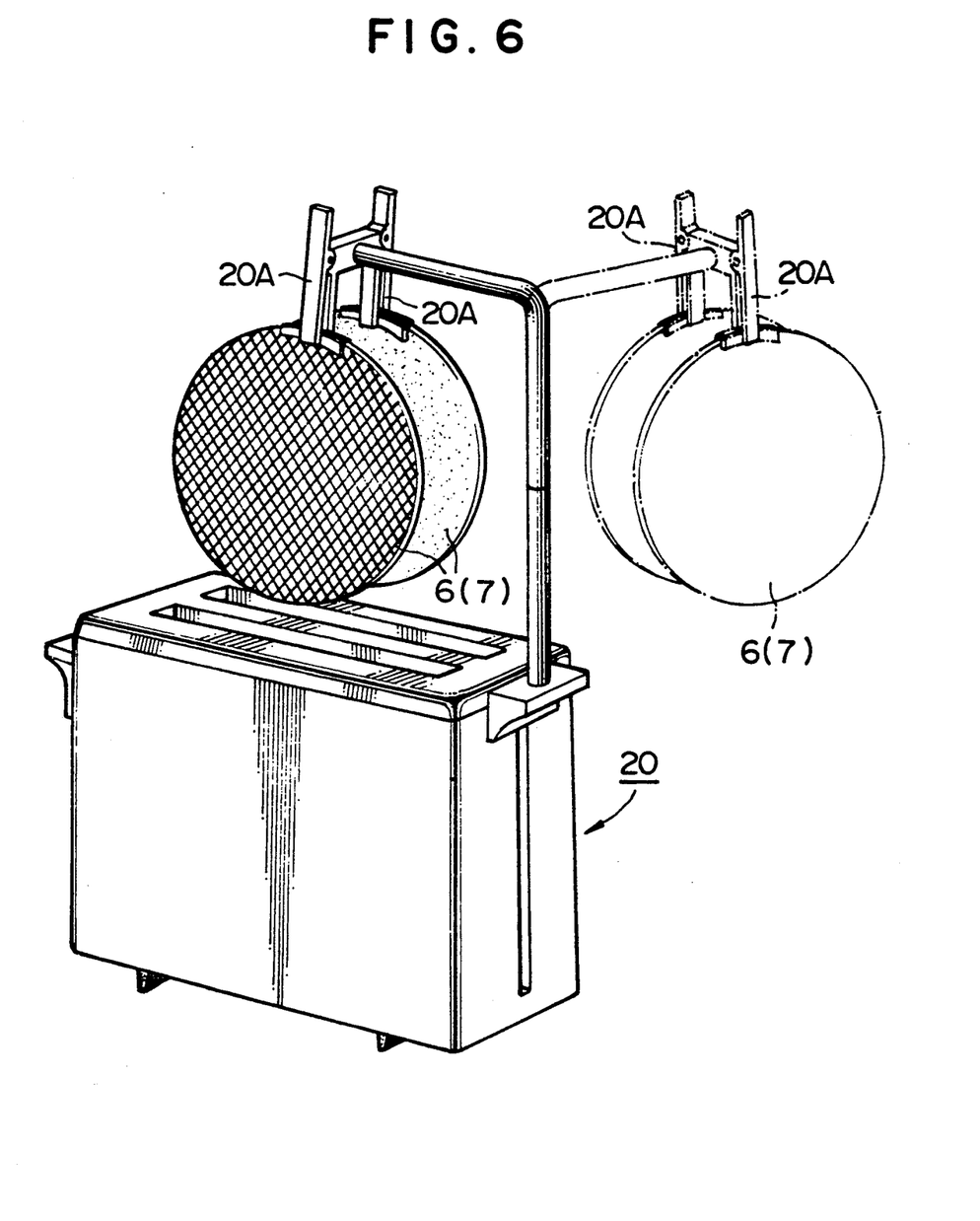
FIG. 6 is a perspective view of the baking apparatus shown in FIG. 5, but in a different state of operation.
Figure 7:
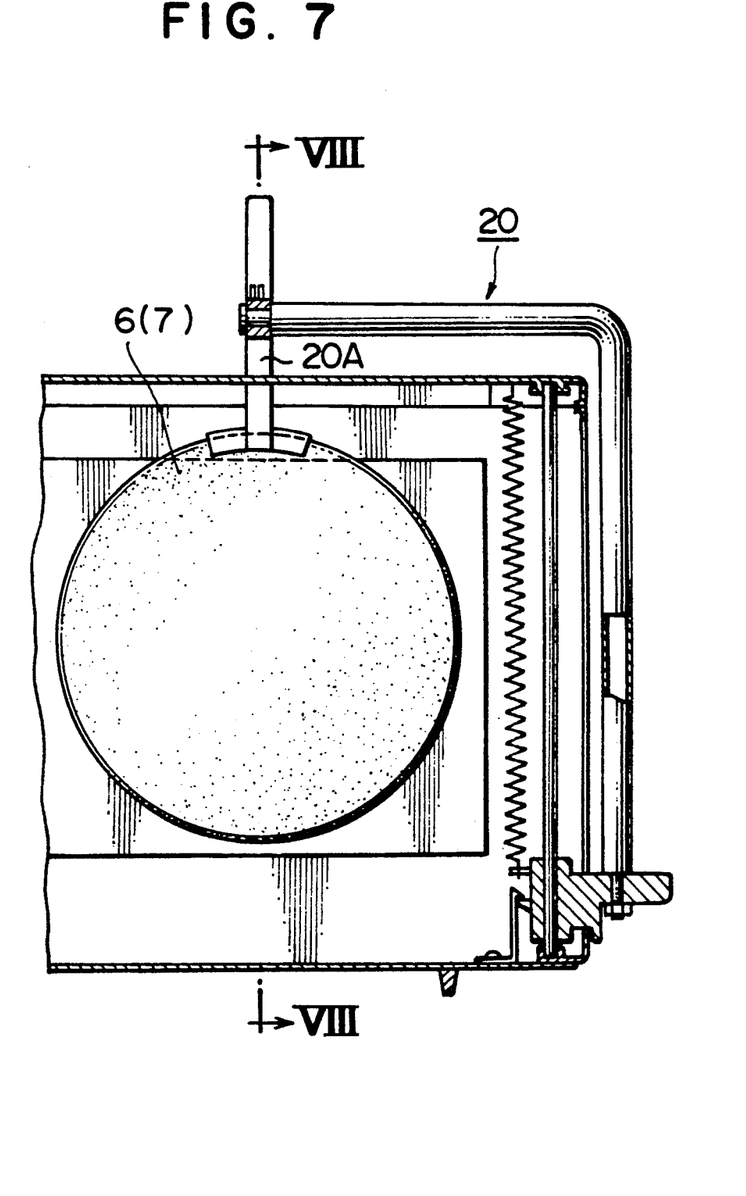
FIG. 7 is a vertical partial cross-sectional view of the final baking apparatus depicted in FIG. 5 showing its essential structural components.
Figure 8:
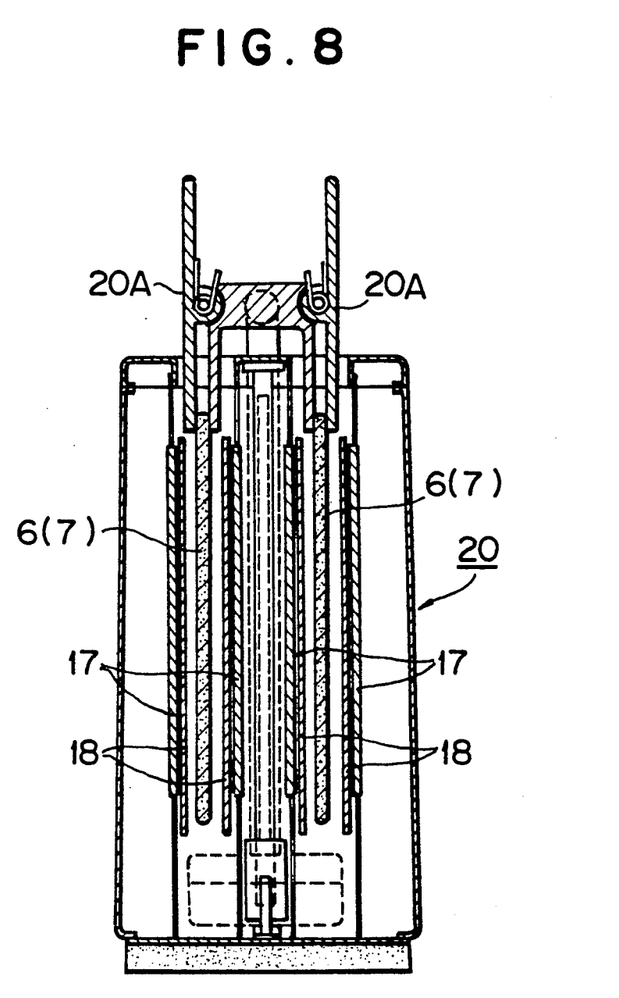
FIG. 8 is a cross-sectional view as taken along the line VIII—VIII in FIG. 7.

This heated and dried molded sheet 5 is thereafter peeled with scraper SC from the top of the heating plate 10 as indicated in FIG. 3 while still in a dry state. The molded sheet 5 is then transferred to the following moisturizing process by belt conveyor B.

The molded sheet 5 weighing roughly 20 grams per sheet that has been transferred from the previous process has a moisture content of roughly 3%. In the present invention, a soft moisturized baked sheet 6 can be obtained by moisturizing the molded sheet 5 in advance so as to attain a moisture content of 10-14% by spraying roughly 2 grams of water with spray nozzles SN on both sides of said molded sheet 5 in spray chamber S as indicated in FIG. 3.

After preventing the surface of moisturized baked sheet 6 from becoming sticky by natural or forced cooling, for example, ten of the moisturized baked sheets 6 may collectively be packed and shipped to users such as ice cream retailers.

Figure 9:
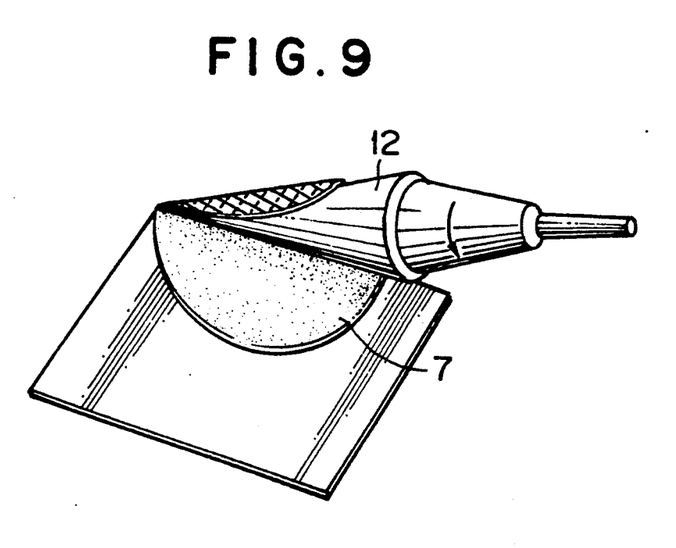
FIG. 9 is an abbreviated component drawing indicating one example of the manner in which the edible container is molded.
Figure 10:
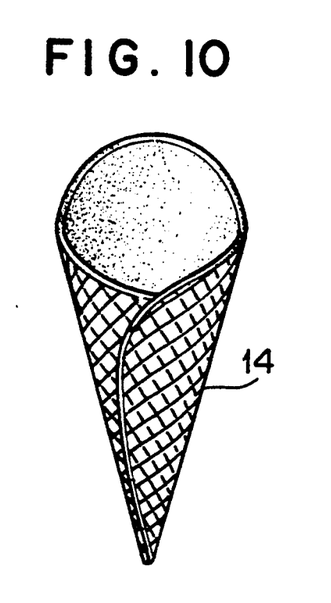
FIG. 10 is a perspective view indicating one example of an edible container obtained according to the present invention.

Then, together with heating and drying the moisturized baked sheet 6 that has been sent in advance, the user performs final baking of moisturized baked sheet 6 as indicated in FIGS. 5-8 using heater 20 for final baking in the form of a toaster, like that indicated in each of the above-mentioned drawings in order to perform softening. Immediately after making the softened sheet 7 resulting from the softening action of the contained sugar and oil an edible container 14 or dish-shaped container is obtained having a crunchy texture as indicated in FIG. 10, by hardening the softened sheet 7 by cooling after forming it into a hollow cone using a commonly known cone former 12 as indicated in FIG. 9.

More specifically, after first adding sugar to wheat flour to give a suitable degree of sweetness, oil along with fragrance, egg, milk, etc. are added as necessary to eliminate scorching and improve flavor. Water is then added to this mixture corresponding to the raw ingredients to an extent that the baked products become porous and lightweight. This mixture is then kneaded to obtain dough 2.

Fixed amounts of dough 2 are incrementally discharged onto lower plate 10a of a pair of heating plates to form kneaded dough 2A in the form of a small lump as indicated in FIG. 1. When the contained moisture is removed by drying to roughly 3% in a heating process, molded sheet 5 having grid pattern 4 is obtained.

By forming a moisturized molded sheet in which water is sprayed onto the molded sheet 5 as mentioned above to give said molded sheet 5 a moisture content of roughly 12% as indicated in FIG. 3, and eliminating any stickiness of the surface by blowing air with fan F as necessary, soft, moisturized baked sheet 6 can be obtained.

The moisturized baked sheet 6 is then inserted between electric heaters 17, 17 equipped with metal plates 18, 18 of toaster-type heater 20 as indicated in FIGS. 5-8 by a user, such as an ice cream retailer, to whom the moisturized baked sheet 6 is shipped. The moisturized baked sheet 6 is then softened by final heating and drying to an extent to which the surface of the dough becomes slightly brown or tan in color by raising the temperature of the heater 20 to 170° C. or more.

When this is done, a final dried and heated softened sheet 7 referred to as the final baked product can be obtained from the dough that is identical to baked products using a continuous baking process for final baking.

Then, by immediately sending this softened sheet 7 to a commonly known cone former 12 like that indicated in FIG. 9 or a commonly known edible dish former for use in making tarts, and cooling to harden after forming said cones or tart dishes, the cone-shaped edible container 14 and edible tart dish can be obtained as indicated in FIG. 10.

Furthermore, grid pattern edible container 14 can be obtained since a grid pattern will appear in molded sheet 5 and moisturized baked sheet 6 during baking if grid pattern 4 is formed in heating plate 10.

Simultaneous to forming by cone former 12, edible container 14 is hardened after forming due to slight cooling. Since the shape of cone-shaped edible container 14 is maintained, said edible container 14 can be sold at stores by serving ice cream in said edible container 14.

Since moisturized baked sheet 6 is heated in advance, the wheat flour starch is alphatized and the protein in the wheat flour is hardened into a protein skeleton to a certain extent. In addition, since the moisture content is roughly 10-15%, it is able to withstand impacts without being cracked or breaking apart. Consequently, said moisturized baked sheet 6 can be delivered without fear of damage.

Moreover, since moisture is removed by sufficient evaporation of moisture during initial heating, molded sheet 5 that has been heated and dried peels extremely easily from heating plate 10. Moreover, since moisturized baked sheet 6 is given a moisture content of only 10-15% by weight, only a small amount of heat is required for elimination of moisture in the final heating process performed at the store where the ice cream and so forth is sold. In addition, since the browning of the surface during baking can be adjusted according to the preferences of the retail store, not only can the baking time at the store be considerably shortened, the problem of diffusion of hot air is solved completely. Furthermore, the following provides a more detailed explanation of the above-mentioned embodiment. First, the ingredients indicated below are mixed well to form dough 2.

| Wheat flour | 100 |
| Sugar | 40 |
| Oil (white strained oil) | 15 |
| Salt | 0.2 |
| (also containin small amounts of egg, milk, salt, coloring, fragrance and so on) | |

Said dough 2 is then poured onto heating plate 10, in which a grid pattern has been formed containing vertical and horizontal lines at 10 mm intervals as indicated in FIG. 1, that surface of which has been heated in advance to a temperature of 180°-200° C. Heating plate 10b is then pressed against the upper surface of heating plate 10a by means of hinges 10c and heating is performed so that the temperature of dough 2 sandwiched between both heating plates 10a and 10b is maintained for a fixed period of time at 160°-180° C. After the dough is baked in this manner, both heating plates 10a and 10b are opened and molded sheet 5 is removed. After cooling, said molded sheet 5 is stored dry forming dry stored baked sheet 6A.

(A) The conditions for pouring of dough 2 and the heating process are as follows:
(1) Amount of dough poured for a single baking: Approximately 25 cc;
(2) Temperature of heating plates (upper and lower, 1 set): 180°-200° C.;
(3) The gap between the two heating plates determines the thickness of the dough, and is to roughly be the thickness of the baked dough;

(B) Conditions for heating process
(1) Gap between heating plates: This is to be the thickness of the baked dough (disk-shaped baked product);
(2) Baking temperature and time: 180° C.-190° C. (heating plate surface), time: 45-90 seconds;
(3) Condition of baked dough (disk-shaped baked product)
(4) Residual moisture of baked dough (as measured using a Kette moisture meter)
(a) The gap between the heating plates is to be 2.5 mm in all cases.

(b) The baking temperatures are to be 170° C. or 190° C., and the baking times are to be 60 seconds at 170° C. or 45 seconds at 190° C.;
(c) The condition and residual moisture content of the heated and dried molded sheet 5 are as follows:
(111) (170° C., 90 seconds)
Yellow, somewhat tinted with a peach color,
Somewhat soft,
Residual moisture content: 5.4%;
(121) (190° C., 45 seconds)
Brownish-yellow,
Somewhat hard,
Residual moisture content: 3.7%

In any case, a heated and dried molded sheet 5 is obtained having a grid pattern consisting of 10 mm squares at a height of roughly 1.5 mm formed on both surfaces.

Although this molded sheet 5 can be eaten as is since the flour starch is alphatized, in this case of the present invention, heated and dried molded sheet 5 is peeled from the top of the above-mentioned heating plate 10 while still dry and transferred to the following heating process. After moisturizing molded sheet 5 that has been transferred from the previous process by spraying with water to a moisture content of roughly 12% to form moisturized molded sheet 5A, moisturized baked sheet 6 is formed having reduced stickiness while still in the moisturized state.

When this is then purchased by the user, by heating moisturized baked sheet 6 in advance in a final heating process to perform final heating, softened sheet 7 is formed by the softening action of the sugar and oil contained therein. Immediately after forming said softened sheet 7, by hardening by cooling after forming into the shape of a cone or dish, etc., edible container 14 (FIG. 10) can be obtained having a crispy texture. <Final Heating>

Final heating, in which the above-mentioned moisturized baked sheet 6 is allowed to stand for 24 hours at 10° C. in a dark location after which it is transferred to the heating process, uses toaster-type heater 20 indicated in the above-mentioned FIGS. 5-8.

In other words, heater 17, comprised of nichrome wires, is provided on both sides of the above-mentioned heater 20. Metal plate 18 having a thickness of roughly 2 mm is provided on the surface of this heater. When this metal plate is heated, a hot flat surface is formed over which temperature is distributed nearly uniformly. Two or more moisturized baked sheets 6 are suspended with clamp-type hangar member 20A one sheet at a time between two hot flat plates at a fixed temperature and for a fixed period of time. The surface of the above-mentioned baked sheet 6 is heated to form heated and dried softened sheet 7.

The surface temperature of the hot flat plate is 170°-200° C., and the interval between the flat plates is roughly 25 mm. Thus, as a result of the interval between the surface of the heated sheet and the surface of the flat plate being roughly 10 mm, when one of the baked discs obtained in this manner is wrapped into a cone shape by means of a forming tool before its temperature decreases, edible container 14 is obtained formed into the shape of a hollow cone. The condition of final baked and dried softened sheet 7 in the shape of a disk that has been cooled without forming, and in particular, the relationship between the baked state, texture (crispiness) and residual moisture content, are as indicated in attached Table 3.

Although the resulting product is both crispy and delicious in any case, the states having different respective heating conditions are evident in the form of differences in texture.

In addition, the residual moisture content of molded sheet 5 described previously is 3.0%±0.5%. The tendency for the conditions at the time of the initial heating process to have an effect on final heating is obvious. It was found that dough heated under the conditions of experiment number (121) can be made into a finished product in 45 seconds if the final heating temperature is 180° C. as is clear in the results of experiment number (221).

Furthermore, in addition to having the shape of a cone, edible container 14 can also have other shapes such as that of a dish.

The present invention offers the following advantages as a result of being composed in the manner described above.

As a result of heating kneaded dough 2A from dough 2 with heating plate 10 at a temperature of roughly 170°-200° C., heated and dried molded sheet 5 is formed having a moisture content of roughly 3%. As this molded sheet 5 has a low moisture content of only 3%, it can be easily peeled from the top of heating plate 10 with scraper SC and so on, thus resulting in the first advantage of the present invention.

Since molded sheet 5 that has been peeled from heating plate 10 becomes brittle and tends to break easily when it hardens if allowed to cool as is, particularly in the case of the present invention, roughly 2 g of water are sprayed in the form of moisturizing spray, etc. onto molded sheet 5 weighing roughly 20 g per sheet after said molded sheet 5 has been peeled from the above-mentioned heating plate 10. This results in molded sheet 5 being moisturized to have a moisture content of 9-14%, thus forming soft, moisturized baked sheet 6. Since this moisturized baked sheet 6 is soft and bendable, it can be easily handled during storage or transport and does not crack or fall apart, thus resulting in the second advantage of the present invention.

Furthermore, after the above-mentioned moisturized baked sheet 6 is shipped to a user such as an ice cream retailer by packing, for example, in packages of 10 sheets each, the user performs heating and drying in advance to soften said moisturized baked sheet 6 that has been delivered so that it can be formed into the shape of cones, etc. At the time of this final heating, since nearly the entire moisture content of moisturized baked sheet 6 is only adhered to the surface of the matrix in the form of surface moisture, thermal transformation of the matrix of moisturized baked sheet 6 is not required to remove that moisture by drying. As such, in comparison to the above-mentioned molded sheet 5A made having an initial moisture content of 10-15%, the amount of time required for the above-mentioned final heating and drying can be remarkably reduced, and running costs can also be lowered since the electrical power per heater can be reduced to ⅓ that in the case of said molded sheet 5A, thus resulting in the third advantage of the present invention in the form of economic feasibility.

Finally, since heated and dried softened sheet 7, immediately following the above-mentioned final heating, drying and softening, can be promptly sold by being formed into edible containers by being able to be rapidly formed into hollow cone or dish shapes due to the softening action of the sugar and oil contained therein, the amount of time customers are kept waiting can be shortened as much as possible, thus resulting in the fourth advantage of the present invention.

TABLE 1

| | Heating Properties |
|---|---|
| Properties | Molded sheet 5A heated for 90 seconds at roughly 120° C. and having a residual moisture content of 10-12% |
| Flexibility on heating plate 10 | Flexible and easily deformed |
| Releasability from heating plate | Peels with difficulty and breaks easily due to getting stuck between the troughs of the scraper. |
| Flexibility after peeling | Remains flexible and bendable even when cooled. |
| Handling ease | Flexible and easy to handle. |
| Final drying and heating time | 40 seconds per sheet at 225° C. |
| Required electrical power for final drying and heating | 300 watts at 40 seconds per sheet |
| Residual moisture content and energy consumption in final heating process | Due to insufficient thermal alteration, the majority of the moisture is comparatively firmly bound with the component matrix. As free water other than bound moisture is also bound to a certain extent in the bound water and matrix, or is in a state surrounded by such, the amount of thermal enery consumed in the final heating process is large. |
| Management for preventing the occurrence of deterioration due to moisture activity | As the majority of the residual moisture is free water that is not bound water of the component matrix, management which suppresses this moisture at or below the amount which increases so-called moisture activity is critically important. |
| Effects on taste and flavor of the final product following the final process | If the amount of time until the final heating process is excessively long, the bonding strenth which component matrix weakens due contains bound water in the to the matrix of the final product not having been treated at a high temperature (180° C. or higher). As such, decreases over time in product quality in the form of beta deterioration of starch and putrefaction of contained oil components have a large effect on taste and flavor following the final heating process. |

TABLE 2

| | Heating Conditions |
|---|---|
| Properties | Molded sheet 5B heated for 90 seconds at roughly 180° C. and having a residual moisture of roughly 3% |
| Flexibility on heating plate 10 | Although somewhat flexible, the matrix is solid. |
| Releasability from heating plate | Peels easily without getting stuck between the troughs of the scraper. |
| Flexibility after peeling | Becomes hard, brittle and breaks easily when cooled. |
| Handling ease | Difficult to handle due to |

TABLE 2-continued

| Properties | Heating Conditions — Molded sheet 5B heated for 90 seconds at roughly 180° C. and having a residual moisture of roughly 3% being brittle. |
| --- | --- |
| Final drying and heating time | 15 seconds per sheet at 225° C. |
| Required electrical power for final drying and heating | 300 watts at 15 seconds per sheet |
| Residual moisture content and energy consumption in final heating process | Due to sufficient thermal alteration, the majority of the moisture is in the form of bound water bound with the component matrix, and there is hardly any free water giving a feeling of moistness. Thus, the amount of thermal energy consumed in the final heating process for softening this baked sheet is extremely low in comparison to the previous baked sheet. |
| Management for preventing the occurrence of deterioration due to moisture activity | As there is virtually no moisture (free water) other than water bound to the matrix, management of moisture activity is completely unnecessary. |
| Effects on taste and flavor of the final product following the final process | There are no changes in taste and flavor over time as long as the product is stored to sufficiently prevent entrance of moisture since heating processing is performed at a high temperature (180° C. or higher). In addition, even if moisture is absorbed, this can be easily removed by heating thus resulting in no change in taste or flavor. |

TABLE 3

| Final Heating Conditions | Final State and Texture | Residual Moisture Content |
| --- | --- | --- |
| (211): Heating of (111) at 180° C. for 90 seconds | Somewhat blackish brown color, crispy | 0.4% or less |
| (221): Heating of (121) at 180° C. for 45 seconds | Somewhat brown, crispiness roughly the same as (212) | Same as above |

I claim:

1. A method of producing an edible container comprising the steps of:
   (a) preparing a dough by mixing raw ingredients comprised of wheat flour, sugar and oil and kneading the raw ingredient mixture with water;
   (b) sandwiching a portion of the dough portion between heating plates;
   (c) heating and drying the dough portion between said heating plates for a time and at a temperature sufficient to alphatize flour starch in the dough and to evaporate moisture from the dough so as to obtain a baked sheet of heated and dried dough;
   (d) removing the baked sheet from the heating plates and transferring the baked sheet to a moisturizing zone;
   (e) moisturizing the baked sheet in the moisturizing zone;
   (f) subjecting the moisturized baked sheet to final heating so as to again heat and dry the baked sheet and to soften the baked sheet to allow a container to be formed therefrom; and thereafter
   (g) forming the softened baked sheet into a container of desired shape.

2. A method as in claim 1, wherein step (c) is practiced for about 90 seconds at 180° C.

3. A method as in claim 1, wherein the baked sheet obtained from set (c) has a moisture content of about 3%.

4. A method as in claim 1 or 4, wherein step (e) is practiced such that the moisturized baked sheet has a moisture content of between 10–14%.

5. A method as in claim 1, wherein step (e) is practiced by spraying water onto at least one side of the baked sheet.

6. A method as in claim 1, wherein step (e) is practiced by spraying water onto both sides of the baked sheet.

7. A method as in claim 1, wherein step (f) is practiced at a temperature of 170° or greater.

8. A method as in claim 1, wherein step (g) is practiced so as to form the softened baked sheet into a cone for containing frozen confections.

9. A method as in claim 1, wherein after step (f) and before step (g), the method further comprises the step of (f1) allowing the baked sheet to stand for a period of time.

10. A method as in claim 9, wherein the baked sheet is allowed to stand for 24 hours at a temperature of 10° C.

* * * * *